United States Patent
Gindlesperger (12)

(10) Patent No.: US 6,397,197 B1
(45) Date of Patent: May 28, 2002

(54) APPARATUS AND METHOD FOR OBTAINING LOWEST BID FROM INFORMATION PRODUCT VENDORS

(75) Inventor: William A. Gindlesperger, Chambersburg, PA (US)

(73) Assignee: e-Lynxx Corporation, PA (US)

(*) Notice: Subject to any disclaimer, the term of this patent is extended or adjusted under 35 U.S.C. 154(b) by 0 days.

(21) Appl. No.: 09/383,371

(22) Filed: Aug. 26, 1999

Related U.S. Application Data

(60) Provisional application No. 60/097,972, filed on Aug. 26, 1998.

(51) Int. Cl.[7] ............................................... G06F 17/60
(52) U.S. Cl. .......................................... 705/37; 705/35
(58) Field of Search ............................. 705/10, 26, 20, 705/21–22, 35, 37; G06F 17/60

(56) References Cited

U.S. PATENT DOCUMENTS

| 5,592,375 A | 1/1997 | Salmon et al. |
| 5,664,115 A | 9/1997 | Fraser |

FOREIGN PATENT DOCUMENTS

| WO | 0075832 | * 12/2000 | ........... G06F/17/60 |
| WO | 075837 | * 12/2000 | ........... G06F/17/60 |
| WO | 0125993 | * 4/2001 | ........... G06F/17/60 |

OTHER PUBLICATIONS

From URL http://www.virginia.edu/~urelat/Guide/Part1–3.html, Buying designing and Printing.*
From URL http://www.discoveringmontana.com/doa/ppd/manualvendor.htm, The University of Montana—Invitation for Bid: printing terms and condition (1 page).*
From URL http://www.access gpo.gov/ifpep/pdfs/procure-gloss.pdf, The printing bids, and the invitation for bid, venndors, and an automated bid list are referred to.*
City of Petersburg: Printing services and the invitation for bids, and the lowest responsible bids are referred to, from URL http://www.stpete.org/purchase/purchase.htm (pp. 1–12).*
From URL http://www.state.sd.us/boa/downloads/SD%20Vendor%20Manual/, Doing business with the state of South Dakota.*
From URL http://www.gsd.das.state.oh.us/printing/PR0176.pdf, A format of vendor's name, product No., with the lowest responsive bidding, delivery time.etc. is suggested.*

(List continued on next page.)

Primary Examiner—Cuong H. Nguyen
(74) Attorney, Agent, or Firm—Patton Boggs LLP

(57) ABSTRACT

A system and method for competitive bid selection from a plurality print and other customized information product vendors based on a database of vendor records, each record identifying a vendor, one or more buyers who approves the vendor for receipt of invitations to bid, and a vendor capability data representing production and economic capabilities of the vendor. A buyer's invitation for bid data is received, representing a specific print and other customized information product or service and an invitation to bid on that product or service, and a data identifying vendor requirements for producing the product is calculated. An vendor's invitation to bid is transmitted to the vendors from among those approved by the buyer associated with the buyer's invitation for bid having a vendor capability data meeting the calculated vendor requirements. Responding bids from the vendors are input into the database and ranked in order of price. The lowest price bid is identified and an order is issued to the selected vendor. Further, a bid information data is transmitted to each of the non-selected vendors, representing the identity of the selected vendor and the rank order value of the bids.

9 Claims, 4 Drawing Sheets

OTHER PUBLICATIONS

From URL http://web.fccj.org/~jbarnard/purchasing_dep/2001Q–74all.pdf, An invitation for bid, and different vendors for printings are referred to. (pp. 1–20).*

From URL http://www.purch.vt.edu/html.docs/bids/639042_041001.pdf, Printing vendors are invited for biddings.*

From URL http://www.ptbus.wa.us/purchasing/bsbooklets.html/, Printing of bus schedule booklets bid specifications, pp. 1–5.*

Prizinsky, GE bid system met with caution, Crains Cleveland Business, v16n11 s1 p3, published date: Mar. 13, 1995.*

* cited by examiner

BOOKS: LOOSE-LEAF, SIDE STITCHED, PERFECT BOUND
- ☐ 10  Products covering 2 or more bid categories
- ☐ 11  Less than 250 — Any page count
- ☐ 12  250 - 999 — Less than 100 pages
- ☐ 13  250 - 999 — 100 or more pages
- ☐ 14  1M - 10M — Less than 100 pages
- ☐ 15  1M - 10M — 100 or more pages
- ☐ 16  Over 10M — Less than 100 pages
- ☐ 17  Over 10M — 100 or more pages BOOKS: SMYTH-SEWN, CASE-BOUND
- ☐ 18  One color thru process color — Any specification BOOKS: SADDLE STITCHED
- ☐ 20  Products covering 2 or more bid categories
- ☐ 21  Less than 250 — Any page count
- ☐ 22  250 - 999 — Less than 16 pages
- ☐ 23  250 - 999 — 16 or more pages
- ☐ 24  1M - 10M — Less than 16 pages
- ☐ 25  1M - 10M — 16 or more pages
- ☐ 26  Over 10M — Less than 16 pages
- ☐ 27  Over 10M — 16 or more pages BOOKS: PASTE ON FOLD
- ☐ 28  Any quantity — Saddle or paste
- ☐ 29  Any quantity — Paste only BINDERY ONLY
- ☐ 30  Library binding — Rebinding existing books
- ☐ 31  Book / Cut Sheet — Pre printed material COMPOSITION
- ☐ 32  CD ROM — Master and replication
- ☐ 33  General — Typesetting
- ☐ 34  Magnetic media — Tape, disc, etc.
- ☐ 35  Variable imaging — Laser, jet spray, etc.

DIE CUTTING & LETTERPRESS
- ☐ 36  Die cutting — Index tabs
- ☐ 37  Die cutting — Kit folders, file folders
- ☐ 38  Die cutting — Custom, templates
- ☐ 39  Crash or overprinting — Furnished stock FOUR-COLOR PROCESS
- ☐ 19  Color Copying — Any quality level
- ☐ 40  Products covering 2 or more bid categories
- ☐ 41  Sheets: Up to 18" — Quality level III
- ☐ 42  Sheets: Over 18" to 29" — Quality level III
- ☐ 43  Sheets: Over 29" to 40" — Quality level III
- ☐ 44  Sheets: Over 40" — Quality level III
- ☐ 45  Products including 2 codes 46 and 47
- ☐ 46  Sheets: Up to 40" — Quality level I/II
- ☐ 47  Sheets: Over 40" — Quality level I/II
- ☐ 48  Books: Not saddle-stitched — Any quality level
- ☐ 49  Books: Saddle-stitched — Any quality level CUT SHEETS (FLAT OR FOLDED, NOT BOUND)
- ☐ 50  Products covering 2 or more bid categories
- ☐ 51  8 1/2x11 & 8x10 1/2 only — 1 to 5M
- ☐ 52  8 1/2x11 & 8x10 1/2 only — Over 5M to 1MM
- ☐ 53  8 1/2x11 & 8x10 1/2 only — Over 1MM
- ☐ 54  Up to 18" — 1 to 10M
- ☐ 55  Up to 18" — Over 10M to 1MM
- ☐ 56  Up to 18" — Over 1MM
- ☐ 57  Over 18" to 29" — Any quantity
- ☐ 58  Over 29" to 40" — Any quantity
- ☐ 59  Over 40" — Any quantity BUSINESS FORM SPECIALTIES
- ☐ 60  Shingled, letter-x, etc. — Various specialties
- ☐ 61  Sales books — Stapled cover
- ☐ 63  Tabulating cards — Any specification
- ☐ 64  OCR or OMR printing — 1 or Multiple parts
- ☐ 65  Re-moistenable glue strip — 1 or Multiple parts
- ☐ 66  Pressure sensitive strip — 1 or Multiple parts
- ☐ 67  Re-moistenable glue strip — Continuous form only
- ☐ 68  Pressure sensitive strip — Continuous form only CONTINUOUS FORMS
- ☐ 70  Products covering 2 or more bid categories
- ☐ 71  11", 22" cut-off — 1 part, except labels
- ☐ 72  11", 22" cut-off — Multiple parts
- ☐ 73  8 1/2", 17" cut-off — 1 part, except labels
- ☐ 74  8 1/2", 17" cut-off — Multiple parts
- ☐ 75  12", 24" cut-off — 1 part, except labels
- ☐ 76  12", 24" cut-off — Multiple parts
- ☐ 77  7", 14" cut-off — 1 part, except labels
- ☐ 78  7", 14" cut-off — Multiple parts
- ☐ 69  Other sizes — 1 part, except labels
- ☐ 89  Other sizes — Multiple parts SNAP APART SETS
- ☐ 80  Products covering 2 or more bid categories
- ☐ 81  1 to 5 parts — 1 to 50M sets
- ☐ 82  1 to 5 parts — Over 50M
- ☐ 83  6 to 10 parts — 1 to 50M sets
- ☐ 84  6 to 10 parts — Over 50M
- ☐ 85  Over 10 parts — 1 to 50M sets
- ☐ 86  Over 10 parts — Over 50 M sets
- ☐ 87  Double stub — Any quantity
- ☐ 88  Tags with multiple parts — Any quantity
- ☐ 62  No stub multiple part sets — Edge glue FLEXOGRAPHY, LABELS, DECALS, SCREEN PROCESS ON LABELS
- ☐ 90  Pressure sensitive — Sheet labels
- ☐ 91  Pressure sensitive — Roll labels
- ☐ 92  Dry gum — Sheet labels
- ☐ 93  Dry gum — Roll labels
- ☐ 79  Marginal punch continuous — Pressure / dry gum SCREEN PRINTING & PRINTING OF PLASTIC, MYLAR, ACETATE
- ☐ 94  Screen Printing — Flat Sheets
- ☐ 95  Screen Printing — Textiles
- ☐ 96  Printing of non-paper — Process not specified MISCELLANEOUS PRINTING PROCESSES
- ☐ 97  Thermography — Any specification
- ☐ 98  Engraving — Any specification
- ☐ 99  Foil stamping, embossing — Any specification SPECIALTY ITEMS
- ☐ 00  Tabloids — Any specification
- ☐ 02  Microfiche — Any quantity
- ☐ 03  Negatives — Mass production
- ☐ 04  Lamination — Any specification
- ☐ 05  Engineering drawings — Diazo, mylar, tracing
- ☐ 06  Tags — Eyelets, stringing
- ☐ 07  Expansion file folders — With gussets
- ☐ 08  3 Ring binders — Any specification
- ☐ 09  Advertising specialties — Any specification ENVELOPES
- ☐ 01  Converting — Blank, printing, imprinting

APPARATUS AND METHOD FOR OBTAINING LOWEST BID FROM INFORMATION PRODUCT VENDORS

This application claims the benefit of provisional application No. 60/097,972 filed Aug. 26, 1998.

FIELD OF THE INVENTION

The present invention generally relates to an apparatus and method for creating a database representing print and other information product vendor pools for one or more subscribing buyers, and for selecting the lowest bidder from the database's represented vendor pool on a per-job basis and, more particularly, for creating and maintaining a database representing a vendor pool for each subscribing buyer of printing and other customized print information product goods and services, the database further representing capabilities of said vendors, receiving invitations-for-bid from buyers, extracting vendor qualification criteria data from said invitations-for-bid, transmitting invitations to bid on said invitations-for-bid to qualified ones of said vendors, based on said vendor qualification criteria data, and selecting from among the responding vendors based on the response price and other factors.

BACKGROUND OF THE INVENTION

Purchase of print and other customized information product goods and services, such as business cards and forms, envelopes, other packaging, labels, pamphlets, CD ROMS, notepads, transparencies, brochures, and bound books differs from non-custom manufactured goods or services in that print and other information product goods and services are generally not pre-stocked as "off-the-shelf" items but, instead, must be specifically manufactured or provided to meet the buyer's particular requirements. Consequently, print and other information product goods and services frequently cannot be purchased "off-the-shelf" at fixed prices appearing on standard price lists. Instead, most print and other information product goods and services are customized to some extent and, accordingly, their prices are established when the specific goods or services are themselves identified, either by an actual order, invitation-for-bid ("IFB"), request-for-quote ("RFQ"), or request-for-proposal ("RFP"); only then can the manufacturer or service provider assess the precise quality and manufacturing or service specifications required to perform the job.

The general procedure used in the prior art of procurement of print and other customized information product goods and services is that the buyer provides the actual order, or the IFB, RFQ, or RFP to one or more printers with whom, in general, the buyer has had sufficient previous experience to know what type of product or level of service can be provided. For purposes of this description, the terms "printer" and "print vendor" are interchangeable and are defined as an entity which manufactures or sells traditional forms of printing or other non-traditional types of information product goods or services, which are or which consist of any tangible medium for communicating or displaying text, images, or other graphical or pictorial information, including, but not limited to, business forms, labels, pamphlets, books, flyers, brochures, transparencies, CD ROMs, stickers, business cards, envelopes, other packaging, and note pads. For purposes of this description the terms "print information product" and "print information goods" are interchangeable and defined to include all of the above-identified goods and services. The printer then reviews the buyer's product manufacturing and delivery specifications or requirements contained in the order, IFB, RFQ, or RFP including physical specifications, characteristics of style, quantities, mode of shipment, delivery schedule, and quality level required to perform individual jobs or estimated job requirements over a given period of time and, based on or extrapolating from previous experiences, provides an estimated price or bid to the buyer. Generally the buyer will provide the order, invitation-for-bid, request-for-quote, or request-for-proposal to a single or very limited number of print vendors, and award the contract co the single or lowest bidder.

In following this general procedure in the prior art, however, buyers of printing and other customized information product goods or services confront the so-called "iron triangle" of quality, timeliness, and cost. Buyers want a product or service that is good, fast, and cheap, but what they discover is that traditional procurements methods will, at best, only achieve two of these three ideals on any given job. Thus, a buyer might demand and receive top quality on a "rush" order, but only at a high cost. Conversely, negotiating a lower price may achieve cost savings, but also compromise quality and timeliness.

This problem is heightened by great elasticity in the so-called "market" price of printing or other customized information product goods or services, which can vary widely from vendor to vendor and from week to week. This elasticity results from the fact that pricing of such customized goods or services greatly depends on (1) the level of service and quality desired, (2) the labor and equipment required to produce the job or provide the service; (3) the amount of time involved in producing the job or providing the service; (4) whether the job or service can be engineered or designed in a cost-effective way; and (5) whether the customer order can be included in the print vendor's production schedule to comply with the required delivery date.

This last factor is particularly crucial. Most print vendors are "hard-iron" manufacturers with high overhead and labor costs. As a result, idle equipment and labor can be devastating to a print vendor's profit margin. At the same time, print vendors must be ready to service their regular customers on short notice, which means planning for downtime in the production schedule to ensure that their machinery is available for "rush" orders. Managing customer job orders in a way that minimizes these "holes" in the production schedule is frequently what distinguishes the profitable print vendor from the insolvent one.

As a result of this tension between the cost of idle equipment and labor and the need to preserve downtime for regular customers, print vendors are constantly seeking short-turnaround jobs to fill their production "holes" when their regular orders do not materialize. To obtain these short-turnaround jobs, many print vendors will resort to extremely low pricing, provided that they can do so without undermining their regular customer relations. This pricing strategy is called "contribution pricing". "Contribution" pricing is the practice of bidding out work at below normal profit margins because any income above out-of-pocket costs "contributes", 100%, to the print vendor's bottom line in comparison to the cost of letting its labor and machinery remain idle. In current printing markets, "contribution" pricing on a regular basis is found only in federal and state government procurements of print information products.

In both public and private sector print information product markets, however, traditional procurement methods and prior art devices have failed to solve this "iron triangle"

because of their inability to take advantage of "contribution" pricing without incurring prohibitive administrative costs or sacrificing quality or timeliness. There are many reasons for this failure. First, the purchase or procurement of printing and other customized information product goods and services frequently requires specialized knowledge and expertise in finding the right print vendor for each job. Most businesses, however, hire purchasing officials with general procurement knowledge who are then given responsibility for a wide range of purchases. As a result, the purchasing official is forced to rely on the print vendor's expertise in designing or engineering a print job, which too often results in the most expensive (and most profitable for the print vendor) design, engineering, or production process.

Second, in order to find the manufacturer or service provider who is willing to offer the lowest "contribution" pricing on any given job, the buyer must often request price quotations from dozens or even hundreds of vendors. In the actual business environment, however, there are difficulties which make selection of a print vendor willing to offer "contribution" pricing difficult for the buyer. There are also difficulties and tradeoffs which make preparation of responding bids difficult for the print vendors. For example, from the buyers perspective, a first difficulty is identifying the pool of print vendors to whom it should send its IFB or RFQ. A larger vendor pool would, in theory, be desirable because it usually means a lower bid can be received. This is well-known in the general business world. However, identifying such a large vendor pool is generally not practical. A main reason is that gathering and maintaining information about a large number of current and potential print vendors is time consuming and expensive. Few companies have the time, money, or inclination to maintain a large, up-to-date database on such potential vendors, particularly when soliciting dozens of bids or quotations will itself require staff and administrative time that costs more than the savings generated from competitive bidding. This disparity is heightened by the fact that most print jobs involve relatively low dollar purchases or procurements.

In addition, even if a buyer were willing to absorb the administrative costs associated with keeping a large database of vendors to improve the competitive bidding, the buyer is often reluctant to do so because quality control becomes more difficult as the vendor pool increases. Part of quality control is to monitor the quality and dependability of goods and services output by each vendor in the vendor pool. This is difficult not due only to the volume of the information, but also to the fact that the buyer must generally obtain such information from its own dealings with the vendor. The reason is that reliability, price history, and quality of a print vendor's work for other buyers may not be obtainable. This is another reason that buyers will not seek goods or services from new vendors because negative information on their reliability or quality may then be learned first hand.

In the pubic sector, where federal and state agencies are often required by law to make bid opportunities available to large numbers of vendors, procurements of print information products typically result in poor quality control and relatively high administrative costs that must be subsidized by the taxpayer. In contrast, traditional procurement methods and prior art devices in the private sector have emphasized quality control by limiting the vendor pool for print information goods and services to a small number of reliable vendors with which it has previously done business. However, as the present inventor has discovered, there is a significant cost problem associated with limiting of the vendor pool to a small number. The problem is that the limited competition results in vendors offering, and charging, higher prices, being undisciplined by a more competitive market. Such prior art methods are typically based on direct negotiation with preferred vendors in established commercial relationships, often resulting in controlled term pricing that lumps procurements together in the hope of enhancing the print buyer's buying power within a narrow pool of vendors; and "best buy" or "best value" procurement practices (which are now being adopted increasingly in the public sector) that are largely creative user or quality control driven.

Because of the limitations of traditional procurement methods, print vendors are often left not only with unscheduled holes in their production schedules, but also unable to fill downtime purposefully set aside for last minute "rush" orders from regular customers. Moreover, even those print vendors who would gain, in an immediate sense, from contribution pricing are frequently unwilling to offer that pricing to their regular customers. The reason is that the regular customer, after once receiving a contribution pricing from its vendor due to the vendor then facing idle machine time, would expect to pay the same low prices for its future print jobs. The regular customer would even expect the vendor to give contribution pricing at times when the vendor lacks idle production capacity. As a result, the vendor would have to displace more profitable work to accept the lower paying work, in order maintain the goodwill of its customer.

The printing industry addresses the problem of maximizing machine utilization without compromising its relationship with preferred customers through sales and marketing efforts which, in turn, increase the cost of each print job and which, ultimately, the print vendor passes to the print buyer through higher prices. The need to maximize factory floor and machine utilization is in no way unique to the printing industry. It is a major concern in many other customized manufacturing operations.

As a consequence of the foregoing, there has been a long felt need for a system and method of competitive pricing for custom printed goods and printing services that: (1) identifies and manages a large vendor pool to obtain the benefit of enhanced pricing competition, without imposing relatively high administrative costs or causing a loss of quality control; (2) offers vendors an inexpensive, cost effective and reliable system for obtaining access to print jobs and specifications without added marketing costs and sales commissions; and (3) does not rely on the vendors' product expertise to establish price, but rather allows each vendor to bid high, bid low, or not bid at all based, strictly, on their production capabilities and need to fill available time in their production schedules.

SUMMARY OF THE INVENTION

The present invention provides a system and method for selecting a printing vendor from a plurality of printing vendors, comprising steps of receiving, at a central, conventional database server termed herein as "the PrintProSys$^{SM}$ server", an initial vendor pool data set from each of a plurality of buyers, the initial vendor data set identifying an initial vendor pool for that buyer, entering the initial vendor pool data set into a vendor database within the "PrintProSys$^{SM}$ server", transmitting an invitation to subscribe to each vendor in the initial vendor pool, receiving a vendor capability data from a sub-plurality of the vendors in the initial vendor pool, the vendor capability data describing each vendor's print capabilities, entering the vendor capability data into the vendor database, receiving at the PrintProSys<sup>SM</sup> server a buyer's invitation-for-bid describing a customized print or other information product or service that the buyer wishes to procure or obtain bids for, calculating or extracting a vendor selection criteria data from the buyer's invitation-for-bid, the vendor selection criteria data defining the values that a vendor's capability data must meet to qualify for, and to receive, a vendor's invitation-for-bid requesting a bid response corresponding to the buyer's invitation-for-bid.

The method of the present invention then compares and correlates the vendor selection criteria data to the vendor capability data field of each vendor data record in the buyer's vendor pool database. The PrintProSys<sup>SM</sup> server then transmits a vendor's invitation-for-bid data to each vendor in the buyer's vendor pool whose vendor capability data field meets the vendor selection criteria data extracted from the buyer's invitation-for-bid data. Next, the PrintProSys<sup>SM</sup> server receives a plurality of responding bid data, each being from a corresponding one of the plurality of vendors to whom a vendor invitation-for-bid data was transmitted, and each representing the transmitting vendor's price for the particular print information goods or services requested. The PrintProSys<sup>SM</sup> server then selects the responding bid data having the lowest represented vendor price and generates information identifying the buyer of the identity of the selected vendor.

Upon the PrintProSys<sup>SM</sup> server's receipt of an approval data from the buyer, it issues an order to the selected vendor for the purchase of the at least one printed item. In addition, the PrintProSys<sup>SM</sup> server's transmits to the remaining non-selected vendors in the vendor pool a bidding result data representing the identity of the selected vendor, and the rank order value of the bid data submitted by all other selection pool vendors.

The PrintProSys<sup>SM</sup> server of the invention has the further ability to maintain multiple vendor pools for each of a plurality of buyers, the multiple vendor pools for a particular buyer corresponding to multiple print product or service types that the buyer procures.

A still further embodiment transmits a data representing the bid price of all received bids, to all vendors who submitted bids.

A further embodiment of the invention assigns a preferred vendor flag to each vendor record and then selects vendors for receiving vendors' invitation-for-bid based on the flag value.

A still further embodiment of the invention automatically generates a set of project milestone data for use in monitoring the winning vendor's progress on the buyer's requested print job or service.

A still further embodiment of the invention receives an invoice data from the winning print vendor upon completion of the job, and generates a corresponding buyer's invoice in response. The system then receives a fund transfer from the buyer based on the buyer's invoice and deposits the fund into an escrow account. Next, the system subtracts a system fee from the deposited amount, transfers that system fee to a system administration account, and transmits the remainder from the escrow to the winning print vendor. This embodiment provides a single source accounting for buyers dealing with a plurality of vendors.

BRIEF DESCRIPTION OF THE DRAWINGS

These features and advantages of the present invention will be more fully disclosed in, or rendered obvious by, the following detailed description of the preferred embodiment of the invention, which is to be considered together with the accompanying drawings wherein like numbers refer to like parts and further wherein:

FIG. 2 is a tabulated format of information fields submitted by potential subscribing print vendors for the pre-qualification step of creating a database of a buyer's pool of print vendor;

DETAILED DESCRIPTION OF THE PREFERRED EMBODIMENTS

The method and apparatus of the present invention will be better understood by a description of its operation in reference to the attached figures.

For purposes of this description the following definitions apply:

The index "i" identifies the particular vendor;

The index "j" identifies a particular buyer;

The value "J" is the number of buyers;

$VR_{ij}$ is the vendor record of the $i^{th}$ vendor in the $j^{th}$ buyer's vendor pool or, equivalently, a vendor record of a vendor "i" that is a approved by buyer "j" for receiving bids on that buyer's jobs;

$K_j$ is the number of vendors in the $j^{th}$ buyer's vendor pool or, equivalently, the number of vendors having vendor records $VR_{ij}$ indicating approval by buyer "j" for receiving bids on that buyer's jobs;

$BVP_j$ is the Buyer's Vendor Pool of the jth buyer, referencing all of the $K_j$ vendor records $VR_{ij}$ associated with the $j^{th}$ buyer; the plurality of $K_j$ vendor records $VR_{ij}$, in the server database is the Buyer's Vendor Pool $BVP_j$, for j=1 to J. Other definitions are recited where appropriate.

Figure 1:
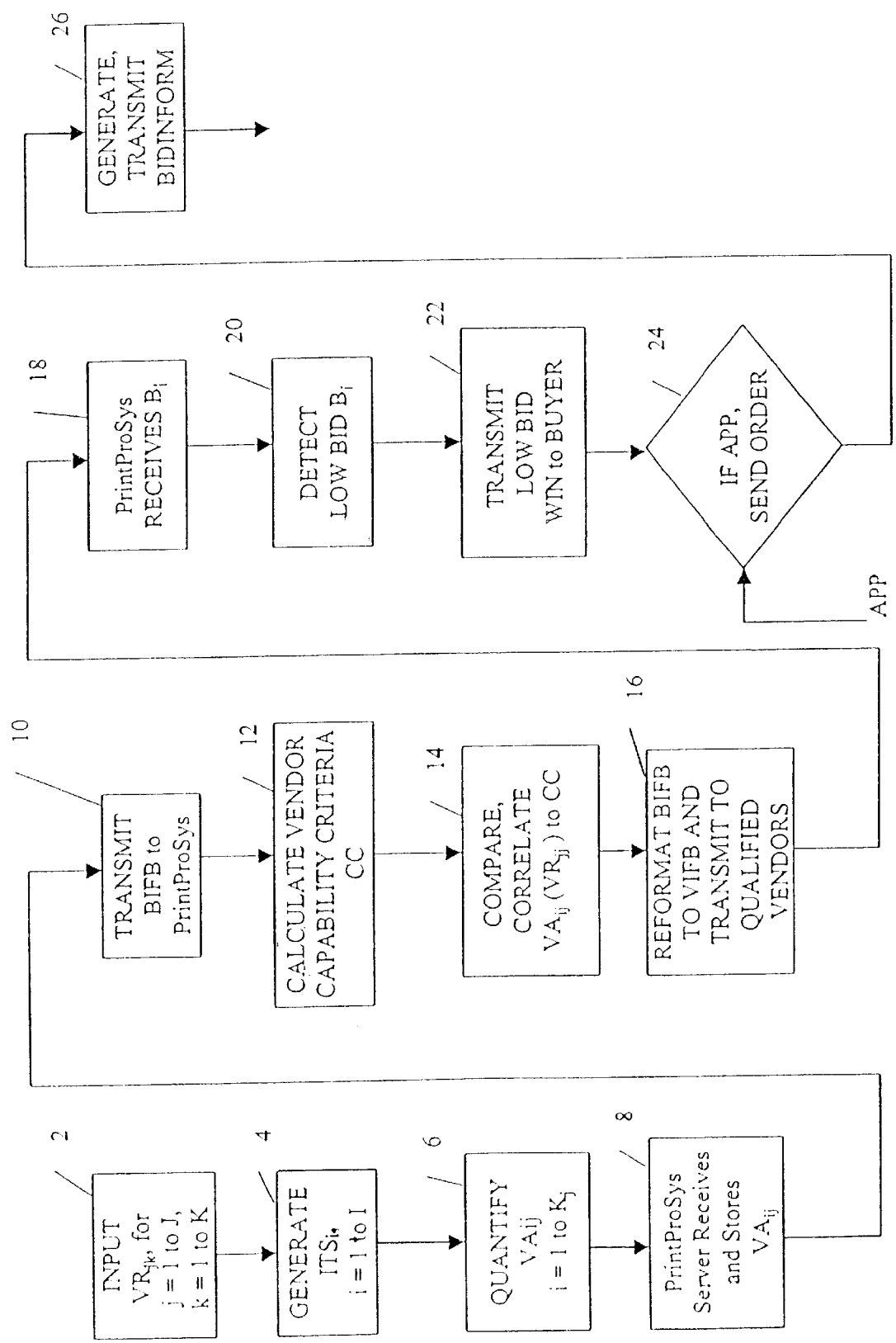
FIG. 1 is a general flow chart showing the steps associated with a preferred first embodiment of the present invention.

Referring to FIG. 1, the process begins at step 2 by inputting for each of J buyers, each identified by the index j, a plurality of $K_j$ vendor records $VR_{ij}$ into the memory of a conventional network server running under Windows NT or any of the equivalent server operating systems that are well-known in the art. The server is termed the PrintProSys<sup>SM</sup> server for purposes of this description.

The method then proceeds to step 4 where an invitation-to-subscribe $ITS_{ij}$, for i=1 to $K_j$, is generated for each of the $K_j$ vendors identified by the $j^{th}$ buyer, for each of the J buyers.

Next, at step 6, a vendor capability attribute data, $VA_{ij}$, for i=1 to $L_j$ is quantified by each of a plurality of $L_j$ vendors, where $L_j$ is the number of vendors from the quantity $K_j$ of vendors in the $j^{th}$ Buyer's Vendor Pool $BVP_j$ from whom a vendor capability attribute data is received. For each $j^{th}$ buyer the value of $L_j$ can range from zero to $K_j$. The vendor capability attribute data, $VA_{ij}$ represents the manufacturing, production, or provider capabilities of the $i^{th}$ or submitting vendor. The vendor capability attributes $VA_{ij}$ are in terms of understandable descriptor words, having specific value tables determined by the particular implementation of the system. An example set of vendor capability attributes $VA_{ij}$ is shown on FIG. 2, and includes the vendor's ability to generate various quantity ranges of: Books, including loose-leaf, side-stitched and perfect bound; Books, Smyth-sown, case-bound; Books, saddle stitched; Books, paste on fold; Binders Only; Print Composition, including CD ROM, general, magnetic media, variable imaging, master and replication; Die Cutting and Letterpress capabilities; Four-Color Process capabilities; Cut Sheets capabilities; Business Form Specialties; Continuous Form capabilities; Snap Apart Sets capability; capability for Flexography, Labels, Decal and Screen Process On Labels; capability for Screen Printing and Printing of Plastic, Mylar and Acetate; Miscellaneous Printing Processes, including thermography, engraving, foil stamping and embossing; capabilities for various Specialty Items, including tabloids, microfiches, negatives, lamination, engineering drawings, tags, expansion file folders, 3-ring binders and advertising specialties; and envelopes.

At step 8 the vendor capability attributes $VA_{ij}$ are transmitted to, received by and stored by the PrintProSys$^{SM}$ server. The vendor capability attribute data $VA_{ij}$ may be submitted by the vendor over the Internet, via an interactive data entry terminal, e.g., a conventional personal computer, as is known in the art.

In an alternative embodiment, the vendor may supply the quantified vendor capability attributes $VA_{ij}$ by paper form (not shown), the data from which is then entered into the PrintProSys$^{SM}$ server storage by manual means. As yet another alternative, the vendor can supply the quantified vendor capability attribute data $VA_{ij}$ by magnetic data storage media, or optical data storage media, or equivalent transportable media of the types that are well known in the data storage arts.

Upon completion of step 8 the PrintProSys$^{SM}$ server contains J of the above-identified Buyer's Vendor Pools $BVP_j$, for j=1 to J, each consisting of $K_j$ vendor records $VR_{ij}$, each vendor record having the received quantified vendor capability attribute data $VA_{ij}$. The quantified vendor capability attribute data $VA_{ij}$ field of the vendor records $VR_{ij}$ for which no data was received are null entries.

Referring to FIG. 1, any of the J buyers, for example the $j^{th}$ buyer, may now proceed to step 10 and transmit a buyer's invitation for bid specification BIFB to the PrintProSys$^{SM}$ server. In response to receiving the BIFB from the $j^{th}$ buyer, the PrintProSys$^{SM}$ server goes to step 12 and calculates or extracts a vendor capability criteria CC from the BIFB, which defines the values that the quantified vendor capability attribute data $VA_{ij}$ field of a vendor record $VR_{ij}$ must have to qualify for bidding on the job defined by the buyer's invitation for bid specification BIFB.

Referring again to FIG. 1, the method proceeds to step 14 where the PrintProSys$^{SM}$ server compares or correlates the extracted a vendor capability criteria CC against the vendor capability attribute data $VA_{ij}$ of each vendor record $VR_{ij}$ in, or having a j value representing of it being in, the $j^{th}$ Buyer's Vendor Pool $BVP_j$. Next, at step 16, for each, if any, of the vendor records $VR_{ij}$ having a vendor capability attribute data $VA_{ij}$ meeting the vendor capability criteria CC, the PrintProSys$^{SM}$ server reformats the BIFB into a vendors' invitation for bid VIFB, and transmits the VIFB to the print vendor based on the name and address field of the vendor record $VR_{ij}$. The vendor's invitation for bid VIFB specifies the print information product or service in a consistent, standardized format so that each receiving vendor will understand clearly all product, delivery and other requirements for the print information item or service that is being placed out for bids by the buyer. This arrangement ensures that the bids are comparable and that mistakes as to the requirements of the buyer are minimized, while enabling each vendor to prepare a more precise calculation of its responding bid $B_i$.

Referring to FIG. 1, at step 18 one or more of the vendors receiving the vendor's invitation for bid VIFB submits a bid $B_i$ to the system, where the index "i" identifies the submitting vendor. The bid is received by and input to the PrintProSys$^{SM}$ data server. Then, at step 20 the PrintProSys$^{SM}$ data server detects the lowest price bid and at step 22 transmits to the buyer a data, WIN, informing of the identity of that lowest price vendor. At step 24 the PrintProSys$^{SM}$ server awaits receipt of approval data APP from the buyer and, upon receipt, issues an order data ORDER to the selected vendor for purchase of the print item or procurement of the printing service at the bid price. If step 24 does not receive the approval data APP no order data ORDER is transmitted. At step 26 the PrintProSys$^{SM}$ data server generates BIDINFORM data representing the remaining non-selected vendors in the vendor selection pool $VSP_{jk}$ and the identity and the bid price of the bids $B_i$ received from all of the responding vendors, and this data is then transmitted to all of the vendors.

A minor variation of the above-described first embodiment, which is not shown, omits the step 4 generation of the invitation-to-subscribe $ITS_{ij}$, for i=1 to $K_j$.

A first embodiment of the invention, and variations thereof, have been described in reference to FIG. 1. In the FIG. 1 embodiment, step 2 inputs a vendor record $VR_{ij}$ for each i vendor which make up an initial vendor pool for each buyer j, and steps 6 and 8 then quantify and input a vendor capability attribute $VA_{ij}$ into one or more of the vendor records $VR_{ij}$. The above-described step 12 then calculates or extracts a vendor capability criteria CC from the invitation for bid BIFB, which defines the values that the quantified vendor capability attribute data $VA_{ij}$ must have to qualify the $i^{th}$ vendor for bidding on the $j^{th}$ buyer's BIFB. Step 14 then selects the vendors that receive the vendor's invitation-for-bid VIFB, based on comparing the vendor capability criteria CC to the quantified vendor capability attribute data $VA_{ij}$ for each the $j^{th}$ buyer's vendors i.

Figure 3:
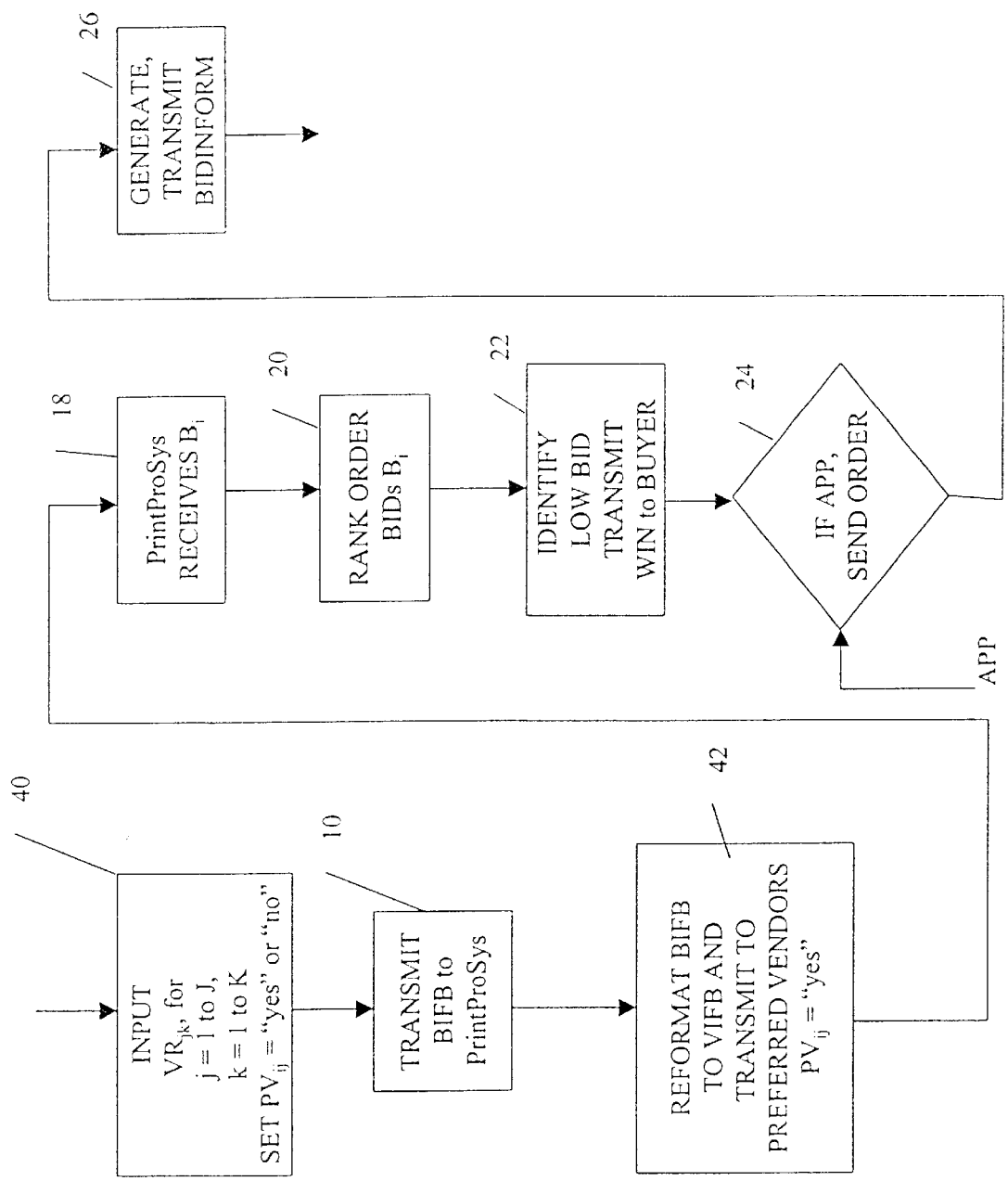
FIG. 3 is a general flow chart showing steps of a second embodiment of the invention, using a preferred vendor flag as a selection criteria for receiving invitations-for-bid.

Referring to FIG. 3, an alternative embodiment is depicted, with like blocks having like labels compared to FIG. 1. In the FIG. 3 embodiment, each vendor record $VR_{ij}$ has a preferred vendor flag $PV_{ij}$. The preferred vendor flag has logical values of "yes" and "no", which represent whether the $i^{th}$ vendor is a preferred vendor for the $j^{th}$ buyer. The value of $PV_{ij}$ can be set at step 40, when the vendor record $VR_{ij}$ is entered. Step 40 is otherwise identical to step 2 of FIG. 1. This embodiment does not enter vendor capability attributes $VC_{ij}$ and does not extract a capability criteria CC from a received buyer's invitation-for-bid. Instead, after receipt of a BIFB at step 10, vendors are selected at step 42 to receive vendor's invitations-for-bid VIFB solely on whether or not the vendor is a preferred vendor of the $j^{th}$ buyer.

Figure 4:
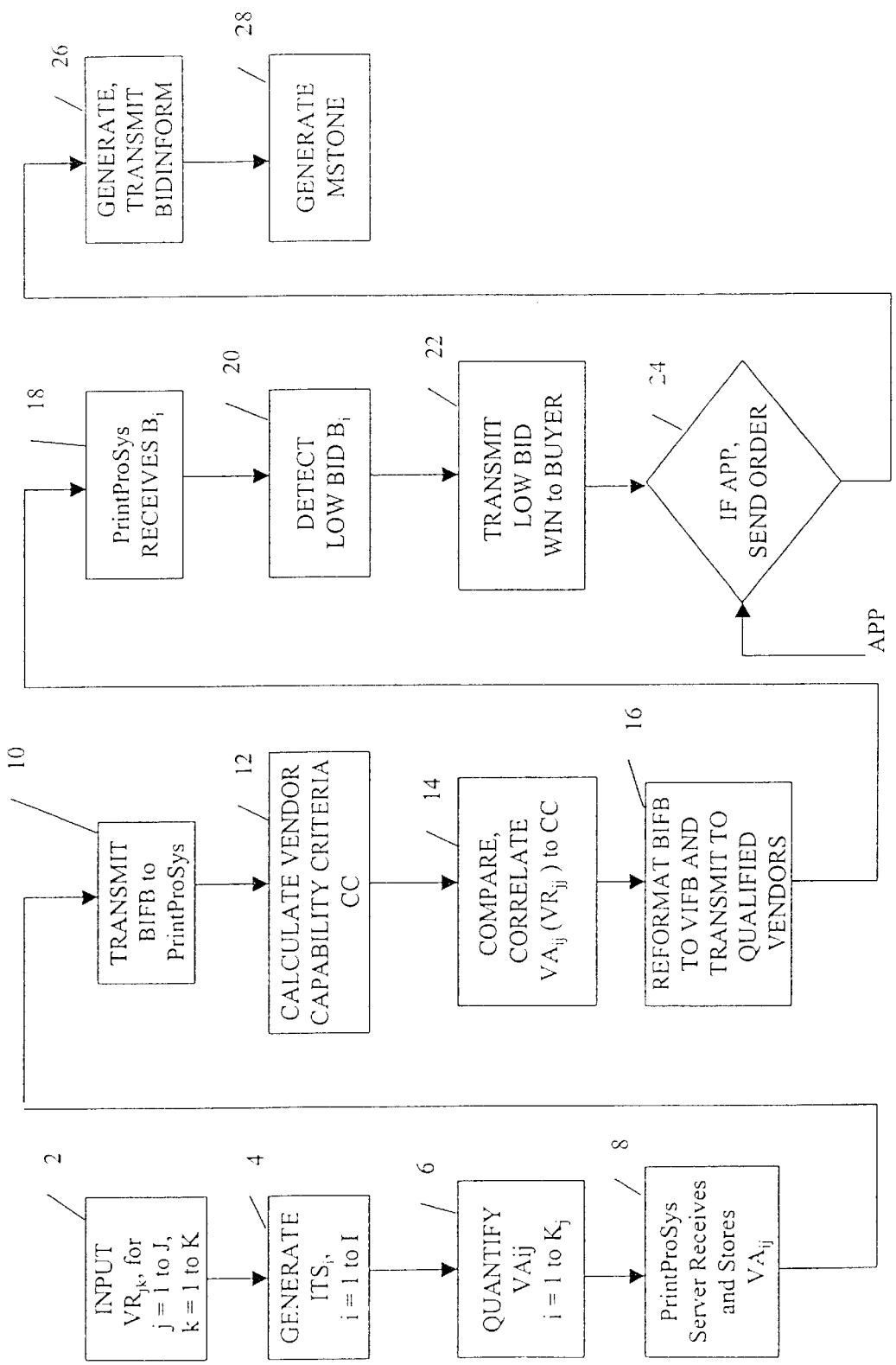
FIG. 4 is a general flow chart of another embodiment of the invention, having a milestone generation feature.

Referring to FIG. 4, an example of a still further embodiment of the invention will be described. The example FIG. 4 embodiment comprises the above-described steps for the FIG. 1 first embodiment, and an additional step 28 at which the PrintProSys$^{SM}$ generates a milestone data set MSTONE representing a set of job milestones calculated from the schedule, quantity and product or service descriptors corresponding to the awarded bid. Example milestones values represented by MSTONE include, but are not limited to, paper and supply availability, scheduling and finishing of prep, proofing, pre-press, press sheet inspections, press work, bindery, special finishing and shipping and delivery.

A still further embodiment, which is not depicted, combines the above-described step 28 of generating a milestone data set MSTONE with the above-described embodiment of FIG. 3.

Another embodiment of the invention combines embodiments of FIGS. 1 and 3, and selects vendors for receipt of vendors' invitation-for-bid VIFB based on either of the two described selection criteria being met, i.e., if the extracted vendor capability criteria CC is met by the vendor capability data $VC_{ij}$, or if the vendor has a preferred vendor $PV_{ij}$ flag value of "yes".

Yet another embodiment of the invention receives an invoice data from the winning print vendor upon completion of the job, and generates a corresponding buyer's invoice in response. The system then receives a fund transfer from the buyer based on the buyer's invoice and deposits the fund into an escrow account. Next, the system subtracts a system fee from the deposited amount, transfers that system fee to a system administration account, and transmits the remainder from the escrow to the winning print vendor. This embodiment provides a single source accounting for buyers dealing with a plurality of vendors.

As can be readily determined by one of ordinary skill in the art of print procurement, there are numerous advantages obtained with the present described invention. First, the invention quantifies both the buyer's needs and the vendors' attributes in a database system that matches objective print information product or service specifications with predetermined vendor quality levels and manufacturing, production, or provider capabilities. The invention creates multiple vendor pools for each buyer, each vendor pool being for a particular type of print information product or service. As a result, the print buyer has a large pool of qualified vendors to which each invitation-for-bid can be distributed. Further, the buyer is no longer dependent on an individual print vendor's specialized knowledge and, instead, is able to obtain competitive pricing based on objective specifications that reflect the buyer's requirements rather than one particular vendor's existing backlog, manufacturing, production, or provider preferences. At the same time, print vendors can calculate more precisely, and hence more competitively, the pricing in their bids due to availability of complete objective specifications. Most importantly, given a sufficiently large vendor pool for each job, combined with the fact that each vendor can bid high, bid low, or not bid at all without concern for loss of the buyer's good will, the buyer is virtually assured of receiving "contribution pricing" from at least one responding vendor on each and every job.

In addition, by employing the invention, the print buyer sets the parameters for both vendor pool selection and for the bidding and award process. The parameters are set in such a way, however, that vendor quality and responsibility is determined at the time each vendor pool is established and only the responsiveness of each vendor's bid is reviewed at the time of award. In this manner, the buyer can create and manage large vendor pools without having to assess the quality of each bidder each time an individual job is bid. Moreover, the bidding and award process is standardized so as to make the dissemination of invitations for bid, the receipt of bids, and the award of the job to the lowest responsive and responsible bidder virtually automatic and without the need for additional procurement staff or the expenditure of related out-of pocket administrative costs.

Moreover, the invention creates a system of "no-holds barred" competitive bidding. Once approved for a vendor bidding pool, the printing vendor no longer has to expend additional costs on sales or marketing to obtain future jobs from the same buyer, or from other buyers with prequalification requirements met by the vendor's capability attributes. The printing vendor is thereby assured access to future bidding opportunities that match the vendor's quantified quality level and/or manufacturing, production, or provider capabilities. In addition, knowing beforehand that the award will go to the lowest responsive and responsible bidder, each participating vendor will have an incentive to submit their lowest bid upfront, rather than hold back their lowest bid, as they would otherwise be inclined to do if the award was still going to be negotiated after bid opening. The invention further provides that all bids can be released to all bidders after award, thereby creating a "ratcheting down" effect as each vendor learns how low the price range is likely to be on similar jobs in the future. As result, buyers who use the invention will benefit from consistently low prices from selected quality vendors, while enabling their purchasing personnel to focus on budget planning, job preparation, internal customer service needs, and production quality and compliance. This problem is heightened by great elasticity in the so-called "market" price of printing or other customized information product goods or services, which can vary widely from vendor to vendor and from week to week. This elasticity results from the fact that pricing of such customized goods or services greatly depends on (1) the level of service and quality desired; (2) the labor and equipment required to produce the job or provide the service; (3) the amount of time involved in producing the Job or providing the service; (4) whether the job or service can be engineered or designed in a cost-effective way; and (5) whether the customer order can be included in the print vendor's production schedule to comply with the required delivery date.

It is to be understood that the present invention is described above in reference to specific embodiments which are for purposes of example only, and that the invention is not limited to the specific arrangement, order of processing, or hardware for carrying out the steps as described hereinabove or shown in the drawings, but also comprises the various modifications readily apparent to one skilled in the art upon reading this specification, as defined by the broadest scope of the appended claims.

What is claimed is:

1. A method for competitive bidding by print information product vendors comprising steps of:

inputting a plurality of vendor records into a storage of a general purpose computer, each of said vendor records having a data field identifying a print information product vendor and a buyer identification data field identifying a buyer that said vendor is associated with, at least one of said vendor records having a vendor capability data representing a set of vendor manufacturing capabilities of the vendor identified by said record;

inputting a buyer's invitation-for-bid data into said general purpose computer, said buyer's invitation-for-bid data having a buyer identification data, and having an invitation for bid on a print information product job from said buyer;

calculating a vendor requirement data from said buyer's invitation-for-bid data, said vendor requirement data representing a set of vendor manufacturing capabilities required for performing said print information product job;

comparing said vendor requirement data to a plurality of said vendor records having a buyer identification data field identifying the buyer from which said buyer's invitation-for-bid data was received;

identifying at least one vendor record as qualified, based on said comparing;

transmitting a vendor's invitation-for-bid data based on said buyer's invitation-for-bid data to each vendor identified by said at least one vendor record;

inputting into said general purpose computer a plurality of bid data, each from one of said vendors to which said vendor's invitation-for-bid data was transmitted, each of said bid data representing a bid price;

identifying a bid data from said received bid data having the lowest represented bid price;

outputting a selected vendor data representing the identity of the vendor corresponding to the bid data identified by said identifying step; and transmitting an order to the vendor represented by said selected vendor data.

2. A method according to claim 1, further comprising a step of:

calculating a job milestone data based on said buyer's invitation-for-bid data.

3. A method according to claim 1 further comprising steps of:

ranking said received bid data according to said resented bid price; and transmitting an information data from said general purpose computer to other vendors identifying said selected vendor and the rank order value of said received data.

4. A method according to claim 2 further comprising steps of:

generating a job progress verification request based on said job milestone data; and entering a data into said central data server representing a job progress corresponding to said job progress verification request.

5. A method according to claim 1, wherein said vendor capability data represents the identified vendor's capability to manufacture each of a plurality of different types of print information products.

6. A method according to claim 1, further comprising steps of:

transmitting a request for vendor capability data to said at least one vendor associated with at least one of said buyers;

receiving a first formatted vendor capability data from said at least one vendor; and converting said first formatted vendor capability data into said vendor capability data, wherein said step of inputting a vendor capability data inputs said converted data.

7. A method according to claim 1 wherein said vendor capability data input for each of a plurality of printing vendors represents a set of vendor capabilities relating to objective and subjective parameters for each of a plurality of types of print information products.

8. A method according to claim 1, further comprising steps of:

inputting into said central data server a completion of job data;

transmitting from said central data server to said buyer an invoice for payment of said bid price;

inputting a payment from said buyer into an escrow account via electronic fund transfer;

subtracting a system access fee data and a licensing fee data from a data representing said payment deposited into said escrow account to generate a remainder payment data; and transferring a payment from said escrow account to an account of said vendor corresponding to said remainder payment data.

9. A system for competitive bidding by print information product vendors comprising:

means for inputting a plurality of vendor records into a storage of a general purpose computer, each of said vendor records having a data field identifying a print information product vendor and a buyer identification data field identifying a buyer that said vendor is associated with;

means for inputting a vendor capability data into at least one of said vendor records, said vendor capability data representing a set of vendor manufacturing capabilities of the vendor identified by said record;

means for inputting a buyer's invitation-for-bid data into said general purpose computer, said buyer's invitation-for-bid data having a buyer identification data, and having an invitation for bid on a print information product job from said buyer;

means for calculating a vendor requirement data from said buyer's invitation-for-bid data, said vendor requirement data representing a set of vendor manufacturing capabilities required for performing said print information product job;

means for comparing said vendor requirement data to a plurality of said vendor records having a buyer identification data field identifying the buyer from which said buyer's invitation-for-bid data was received, and generating a comparison result;

means for identifying at least one vendor record as qualified, based on said comparison result;

means for transmitting a vendor's invitation-for-bid data based on said buyer's invitation-for-bid data to each vendor identified by said at least one vendors record;

means for inputting into said general purpose computer a plurality of bid data, each from one of said vendors to which said vendor's invitation-for-bid data was transmitted, each of said bid data representing a bid price;

means for identifying a bid data from said received bid data having the lowest represented bid price;

means for outputting a selected vendor data representing the identity of the vendor corresponding to the bid data identified by said identifying means; and means for transmitting an order to the vendor represented by said selected vendor data.

* * * * *